United States Patent
Depner

(10) Patent No.: US 10,800,237 B2
(45) Date of Patent: Oct. 13, 2020

(54) METHOD AND DEVICE FOR DETERMINING A POSITION OF AN ACTUATING ELEMENT

(71) Applicant: Robert Bosch GmbH, Stuttgart (DE)

(72) Inventor: Dieter Depner, Lichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/469,889

(22) PCT Filed: Dec. 13, 2017

(86) PCT No.: PCT/EP2017/082645
§ 371 (c)(1),
(2) Date: Jun. 14, 2019

(87) PCT Pub. No.: WO2018/114531
PCT Pub. Date: Jun. 28, 2018

(65) Prior Publication Data
US 2019/0315213 A1    Oct. 17, 2019

(30) Foreign Application Priority Data
Dec. 19, 2016    (DE) .................... 10 2016 225 403

(51) Int. Cl.
*B60J 7/22*    (2006.01)
*G01D 5/12*    (2006.01)
*G01P 3/48*    (2006.01)

(52) U.S. Cl.
CPC ............... *B60J 7/223* (2013.01); *G01D 5/12* (2013.01); *G01P 3/48* (2013.01)

(58) Field of Classification Search
None
See application file for complete search history.

(56) References Cited

U.S. PATENT DOCUMENTS 5,184,055 A * 2/1993 Ohishi ................ G03F 7/70691
318/561
6,462,505 B1 10/2002 Spingler
(Continued)

FOREIGN PATENT DOCUMENTS

DE         4135873       4/1993
DE         19947837      4/2001
(Continued)

OTHER PUBLICATIONS

International Search Report for Application No. PCT/EP2017/082645 dated Apr. 19, 2018 (English Translation, 3 pages).

*Primary Examiner* — Bentsu Ro
(74) *Attorney, Agent, or Firm* — Michael Best & Friedrich LLP

(57) ABSTRACT

The invention relates to a method for determining the position of an actuating element (3) in a positioning system (1), having the following steps: —continuously detecting a signal profile of a sensor signal from an acceleration sensor (7) which is fitted to an electric-motor actuating drive (5) of the positioning system (1), in order to detect an acceleration on account of a force excitation by a detent torque and/or an imbalance of a rotor of the electric-motor actuating drive; —evaluating the signal profile in order to detect an oscillation; —determining the position of the actuating element (3) on the basis of the detection of the oscillation.

9 Claims, 2 Drawing Sheets

(56) References Cited

U.S. PATENT DOCUMENTS

| | | | | |
|---|---|---|---|---|
| 2005/0283918 A1* | 12/2005 | Zhang | ................... | D06F 37/203 |
| | | | | 8/158 |
| 2006/0271334 A1* | 11/2006 | Yi | ......................... | G01D 5/245 |
| | | | | 702/150 |
| 2014/0330480 A1* | 11/2014 | Kopper | ................... | G01P 21/00 |
| | | | | 701/33.1 |
| 2019/0212146 A1* | 7/2019 | Kobayashi | ............. | G01C 17/02 |

FOREIGN PATENT DOCUMENTS

| | | |
|---|---|---|
| DE | 202005018412 | 3/2007 |
| DE | 102009000021 | 7/2010 |
| DE | 102010021186 | 11/2011 |
| DE | 102012209806 | 12/2013 |
| DE | 102014213514 | 1/2016 |
| JP | 2007144580 | 6/2007 |
| WO | 2015136513 | 9/2015 |

* cited by examiner

METHOD AND DEVICE FOR DETERMINING A POSITION OF AN ACTUATING ELEMENT

BACKGROUND OF THE INVENTION

The present invention relates to actuating apparatuses as are used for automatic window lifters and roof closing installations in a motor vehicle, for example.

Automatic actuating apparatuses normally have an actuating element (windowpane, sliding roof) that is electrically driven by an electric motor of an actuating apparatus. The electric motor is for the most part actuated by a control unit coupled to an operator control element in order to take operation of the operator control element as a basis for actuating the electric motor and for describing the direction of movement thereof.

In the case of actuating apparatuses on a motor vehicle, such as for example electric window lifters, electric sliding roofs and the like, it is necessary to ensure that, during a closing process, in which the actuating element is moved in the direction of a stop edge (window frame, roof recess), there are no items or body parts that can be damaged or injured. In order to avoid such a case, an algorithm is implemented, if there is a control unit present, that detects an instance of jamming during a closing process of the actuating element. If the instance of jamming is detected, the closing process is interrupted or reversing is performed, which involve the actuating element at least briefly performing an opening movement.

It is usual for the stop edge against which the actuating element is moved to be provided with a seal, so that the resistance during a closing process increases shortly before the actuating element hits the stop edge. Thus, in particular in the case of automatic window lifters, there is provision for a function that involves the antijamming function being deactivated shortly before a completely closed position is reached, in the case of which the actuating element enters the seal at the stop edge. The area in which the antijamming function is deactivated is chosen to be so narrow that there is no realistic risk of items or body parts getting in. Deactivating the antijamming function in this area prevents an instance of jamming from being erroneously detected when the actuating element enters the seal, and for example reversing of the direction of movement of the actuating element being triggered as a corresponding reaction.

This function requires the position of the actuating element to be known. The position of actuating element can generally be determined on the basis of a position of a rotor of the electric motor driving the actuating element.

In particular in the case of window lifter systems in motor vehicles, the position of the actuating element is detected by means of a relative rotational movement of the electric motor of the actuating apparatus. On account of the known coupling mechanics between the electric motor and the actuating element, the position of the actuating element can be established for the defined initial state, such as e.g. a completely open position or a closed position of the actuating element, by integrating the distance implemented by means of the rotational movement of the electric motor. To detect the relative position of the rotor of the electric motor, there is normally provision for position sensors on the shaft of the window lifter drive, such as e.g. Hall sensors, or the rotor position is ascertained by evaluating a current ripple in a sensorless manner. Both methods are complex, since either there needs to be provision for additional components or the electromagnetic layer needs to be altered. This normally leads to poor efficiency or there is also the need to provide for appropriate computing capacity in a motor controller.

It is therefore desirable to make available improved detection of the position of an actuating element in a positioning system, in particular a windowpane in a window lifter system.

SUMMARY OF THE INVENTION

This object is achieved by the method for determining the position of an actuating element of a positioning system, in particular a windowpane of a window lifter system, and an apparatus and a positioning system.

According to a first aspect, a method for determining a position of an actuating element in a positioning system is provided, having the following steps:

continuously detecting a signal profile of a sensor signal of an acceleration sensor mounted on an electric-motor actuating drive of the positioning system in order to detect an acceleration on the basis of a force excitation by a detent torque and/or an imbalance of a rotor of the electric-motor actuating drive;
 evaluating the signal profile in order to detect an oscillation;
 determining the position of the actuating element on the basis of the detecting of the oscillation.

A concept of the above method is to establish the position of the actuating element by establishing a relative change of position of the rotor that has been ascertained by evaluating a vibrational oscillation of the actuating drive. A vibration of the actuating drive arises as a result of detent torques of the rotor in the event of a rotation of the rotor in the magnetic circuit. On the basis of the bearing of the rotor in the pole pot of the actuating drive, this leads to a force excitation of the actuating drive that acts radially and tangentially in relation to the rotor. Also, imbalances, which cannot be avoided in a real design of a drive motor of the actuating drive, can likewise lead to radial force excitations. A movement of the rotor therefore leads to periodic oscillations that each indicate a particular rotational position of the rotor, and hence a change of position of the actuating drive.

The use of a vibration or acceleration sensor on the actuating drive allows additional signal transmitters for position determination, such as for example rotor position sensors based on Hall sensors, and the like to be dispensed with and hence installation space and weight to be saved. Furthermore, the positioning system is also capable of detecting a passive rotational movement e.g. when external forces are exerted on the actuating element, since these likewise lead to formation of the oscillation of the sensor signal on the basis of the action of the detent torques and/or the imbalance of the rotor.

The electromagnetic design of the drive motor, which normally impairs efficiency in the case of sensorless position detection, can be dispensed with. In particular, the multi-access detection directions mean that the acceleration profiles or vibration profiles can also be used to ascertain the direction of rotation of the rotor.

As a result of evaluation of the vibration signal using a Fourier analysis, oscillation frequencies can arise that provide information about the characteristic movement patterns for the actuating drive at constant speed. By evaluating individual oscillations of the vibration signal, a relative change of position can then be assigned to each oscillation of the vibration signal.

By integrating the number of oscillations of the vibration signal on the basis of the direction of rotation, the position of the actuating element can be determined. In this manner, it is possible to use a simple acceleration sensor to provide position detection for an actuating element.

Furthermore, determination of the position of the actuating element can be prompted by adjusting a counter value, wherein the adjusting of the counter value comprises incrementing and decrementing the counter value on the basis of a direction of rotation, the direction of rotation of the actuating drive being ascertained by evaluating two sensor signals representing accelerations of the actuating drive in two different directions.

There can be provision for the acceleration sensor to provide at least two sensor signals indicating accelerations in two radial directions of the rotor, which act transversely with respect to one another, or in one radial and one tangentially or axially acting direction of the rotor of the actuating drive.

According to one embodiment, the signal profile for a rotation of the actuating drive can be periodic and have multiple periodicities, a periodicity of lower frequency being used for checking the plausibility of the counter value. The periodicity of a lower frequency can be brought about by an imbalance of the rotor, for example, whereas a periodicity at a higher frequency is caused by the detent talk of the individual rotor teeth.

According to a further aspect, there is provision for a control unit for determining a position of an actuating element in a positioning system, wherein the control unit is designed to:
  receive a signal profile of a sensor signal of an acceleration sensor mounted on an electric-motor actuating drive of the positioning system in order to detect an acceleration on the basis of a force excitation by a detent torque and/or an imbalance of a rotor of the electric-motor actuating drive;
  evaluate the signal profile in order to detect a completed oscillation;
  determine the position of the actuating element on the basis of the detecting of the completed oscillation.

According to a further aspect, there is provision for a positioning system, comprising:
  an actuating drive for driving an actuating element;
  an acceleration sensor, coupled to the actuating drive, for providing a sensor signal, wherein the acceleration sensor (7) is mounted on an electric-motor actuating drive (5) of the positioning system (1) in order to detect an acceleration on the basis of a force excitation by a detent torque and/or an imbalance of a rotor of an electric-motor actuating drive;
  the above control unit.

Furthermore, the acceleration sensor may be arranged on a pole pot of an actuating drive in the form of an electric motor.

According to one embodiment, the above positioning system may be part of a closing system, in particular of a window lifter installation or sliding roof system, in a motor vehicle.

BRIEF DESCRIPTION OF THE DRAWINGS

Embodiments are explained in more detail below on the basis of the appended drawings, in which.

DETAILED DESCRIPTION

Figure 1:
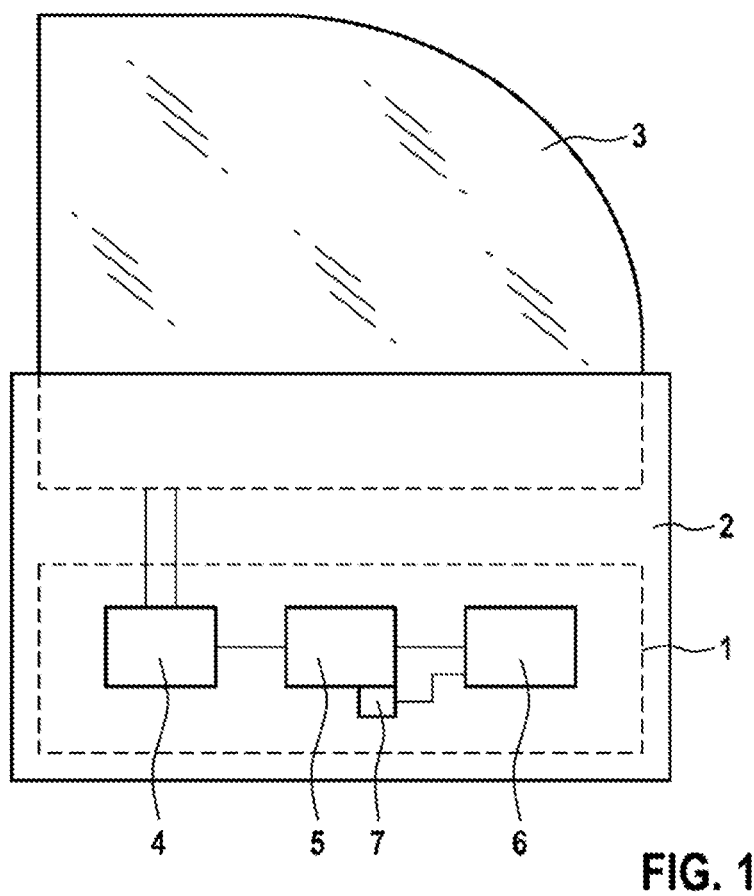
FIG. 1 shows a schematic depiction of a window lifter system for a motor vehicle.

FIG. 1 shows, in exemplary fashion, a schematic depiction of a positioning system 1 in the form of a window lifter installation in a vehicle door 2. The vehicle door 2 contains a windowpane as the activating element 3, which is movable using the window lifter installation 1. To this end, the actuating element 3 is coupled to an actuating drive 5 by means of a mechanism 4 (mechanical connection), so that operating the actuating drive 5 allows the actuating element 3 to be moved upward or downward.

The activating drive 5 has an electric motor and is actuated by means of a control unit 6 to which a control signal for moving the actuating element 3 or a state signal can be provided externally. There can be provision for the electric motor with an internal rotor and a stator arranged in a pole pot—for example with permanent magnet poles—in a manner known per se. The electric motor can be in the form of a mechanically commutated electric motor. In this case, individual coils arranged on the rotor teeth are supplied with current via a commutator.

The state signal can indicate whether the vehicle pane as actuating element 2 is meant to be opened. The control signal can be provided by an operator control element, for example, and can indicate operation of an operator control element. The control unit 6 can also be installed partly or wholly outside the vehicle door 2 as a central control element (e.g. for multiple doors) in the vehicle.

The control unit 6 is furthermore coupled to an acceleration sensor 7 on the actuating drive 5. The acceleration sensor 7 can be in the form of a conventional micromechanical acceleration sensor 7. For the purpose of detecting a tangential force excitation, the acceleration sensor 7 can be designed to be at sufficient distance from the rotational axis of a rotor or can be in the form of or comprise a gyroscope.

The acceleration sensor 7 can be arranged on the actuating drive 5 and detect radially, tangentially and axially acting force excitations, presenting as vibrations, that arise in the event of a rotation of a shaft of the actuating drive 5. The force excitations radially and tangentially in relation to the shaft are periodic and occur on the basis of detent torques as a result of permanent magnets or imbalances of the rotor. The acceleration sensor 7 can be managed in particular on the pole pot of the actuating drive 5 at the axial ends thereof or inside the drive, in particular on the brush holder or a sensor circuit board.

In this regard, the acceleration sensor 7 provides one or more sensor signals representing an acceleration value. In order to detect the direction of rotation of the actuating drive 5, it is possible for there to be provision for the acceleration sensor 7 with at least two sensor axes, which are preferably oriented transversely with respect to axial direction of the rotor, so that the latter provides a first sensor signal and a second sensor signal. Evaluation of the sensor signal of an acceleration in the axial direction of the rotor allows e.g. the direction of rotation to be detected.

As such, the sensor signals can have periodicities dependent on the rotational speed, which, owing to the imbalance of the shaft, corresponds to the rotational frequency f, i.e. revolutions per second (rps), and to a multiple of the rotational frequency of N*f corresponding to the number N of groove openings.

Figure 2:
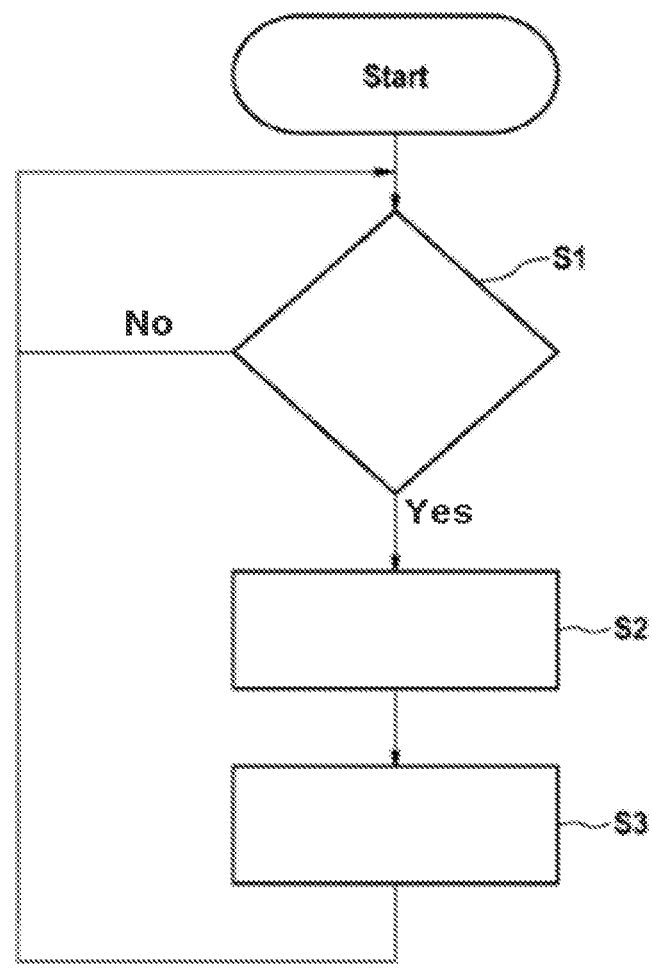
FIG. 2 shows a flowchart to illustrate a method for determining a current position of a closing element of a window lifter system.

The control unit 6 can use the sensor signals detected by the acceleration sensor 7 to perform an evaluation for ascertaining the current position of the actuating element 3. To this end, the control unit 6 carries out the method illustrated using the flowchart in FIG. 2. An appropriate algorithm can be realized in the form of software or hardware.

The method is based on signal profiles of the first and second sensor signals of the acceleration sensor 7, which signal profiles continually detect and record two accelerations of the actuating drive 5 that run at right angles to one another. Thus, for performance of the method described below, there are signal profiles of the first sensor signal and of the second sensor signal lying in two radial directions, for example, in particular two radial directions at right angles to one another, or in one radial direction and one tangential direction. The signal profiles are periodic on the basis of the rotation of the actuating drive 3.

In step S1, a check is performed to determine whether the sensor signals have changed since the last detection. If no change is found (alternative: No), it is assumed that the actuating drive 5 is at a standstill and the method returns to step S1. Otherwise (alternative: Yes), the method continues with step S2.

Evaluation of the signal profiles or an evaluation of the nonperiodic sensor signal for the axial direction of the rotor initially allows the direction of rotation for each of the oscillations, which is described by the periodic signal profiles, to be ascertained in step S2.

The direction of rotation can be ascertained by a phase offset between characteristic points in the oscillations of the signal profiles of the two sensor signals. By way of example, a phase offset of $\pi/2$ can indicate a first direction of rotation and a phase offset of $3/2\pi$ can indicate a second direction of rotation. The characteristics points can be indicated by the local maximum or the local minimum. The local minima or local maxima are detected using methods that are known per se, in particular by finding a zero crossing for the first derivative of the signal profiles.

In step S3, a counter value is incremented or decremented on the basis of the detected direction of rotation. The counter value can be a counter value of a counter implemented in hardware of the control unit 6 or of a software counter. As such, the counter value can be incremented in a first direction of rotation and decremented in a second direction of rotation, opposite thereto. In this manner, when a last oscillation is detected, a counter value can be made available that is provided on the basis of a known position of the actuating element 3. When a known position of the actuating element 3 (end stop) is reached, the counter value can be reset to a reference value.

In the continuous process, the method is preferably performed on detection of a new oscillation, i.e. a next characteristic point in the first or the second sensor signal, in the signal profile, the counter value being incremented or decremented as appropriate for each newly detected oscillation (completed period).

By way of example, the direction of rotation can be dependent on whether the signal profile of the second sensor signal has a maximum or a minimum at a time after a local maximum of the first sensor signal. If the signal profile has a maximum next, then the counter value can be incremented, otherwise it can be decremented. Alternatively, a further sensor signal for e.g. the axial force excitation can be used in order to detect directions of rotation. The reason for this is that at the start of the actuating process the gear engagement of a worm arranged on the rotor shaft in a worm gear means that the rotor shaft undergoes an axial acceleration corresponding to the direction of rotation of the rotor.

After step S3, the method continues with step S1 in order to achieve a cyclic update of the counter value.

The counter value represent a current position of the actuating element 3, i.e. the counter value can be ascertained in a current position of the actuating element 3 by a prescribed transfer function of the mechanical coupling between the actuating drive 5 and the actuating element 3. To convert the counter value to the current position of the actuating element 3, knowledge of the number of detent torques per revolution or other comparable detail is necessary, so that each oscillation can be assigned a predetermined adjustment distance for the actuating element 3. The detent torque is determined by the number of rotor teeth and the number of stator poles and can be ascertained empirically beforehand.

By evaluating the level of the local maxima and minima of the oscillations, it is also possible to detect a complete revolution of the stator of the actuating drive 5 a occurring on the basis of an imbalance, particularly high local maxima or in particularly low local minima, and, as a result, to perform a plausibility check for the counter value.

The invention claimed is:

1. A method for determining a position of an actuating element (3) in a positioning system (1), comprising:
   continuously detecting a signal profile of a sensor signal of an acceleration sensor (7) mounted on an electric-motor actuating drive (5) of the positioning system (1) to detect an acceleration based on a force excitation by (a) a detent torque, (b) an imbalance of a rotor of the electric-motor actuating drive, or a combination of both (a) and (b);
   evaluating the signal profile to detect an oscillation;
   determining the position of the actuating element (3) based on the detecting of the oscillation.

2. The method as claimed in claim 1, wherein the detecting of the oscillation is taken as a basis for adjusting a counter value, wherein the adjusting of the counter value comprises incrementing and decrementing the counter value based on a direction of rotation, the direction of rotation of the actuating drive (3) being ascertained by evaluating two sensor signals representing accelerations of the actuating drive in two different directions.

3. The method as claimed in claim 1, wherein the acceleration sensor (7) provides at least two sensor signals indicating accelerations in two radial directions of the rotor of the actuating drive (3), which act transversely with respect to one another, or in one radial and one tangentially acting direction of the rotor.

4. The method as claimed in claim 1, wherein the signal profile for a rotation of the rotor is periodic and has multiple periodicities, a periodicity of lower frequency being used for checking the plausibility of the counter value.

5. The method as claimed in claim 1, wherein a signal profile of a sensor signal of an acceleration sensor (7) is detected for a force excitation in the axial direction of the rotor, the detected signal profile for the axial direction being taken as a basis for determining a direction of rotation of the actuating element (3).

6. A control unit (6) for determining a position of an actuating element (3) in a positioning system (1), configured to:
   receive a signal profile of a sensor signal of an acceleration sensor (7) mounted on an electric-motor actuating drive (5) of the positioning system (1) to detect an acceleration based on a force excitation by (a) a detent torque, (b) an imbalance of a rotor of the electric-motor actuating drive, or a combination of both (a) and (b);

evaluate the signal profile in order to detect a completed oscillation;

determine the position of the actuating element (3) based on the detecting of the completed oscillation.

7. A positioning system, comprising:

an actuating drive (5) for driving an actuating element (3);

an acceleration sensor (7), coupled to the actuating drive (5), for providing a sensor signal, wherein the acceleration sensor (7) is mounted on an electric-motor actuating drive (5) of the positioning system (1) in order to detect an acceleration based on a force excitation by (a) a detent torque, (b) an imbalance of a rotor of the electric-motor actuating drive, or a combination of both (a) and (b); and a control unit (6) configured to receive a signal profile of a sensor signal of an acceleration sensor (7) mounted on an electric-motor actuating drive (5) of the positioning system (1) to detect an acceleration based on a force excitation by (a) a detent torque, (b) an imbalance of a rotor of the electric-motor actuating drive, or a combination of both (a) and (b);

evaluate the signal profile to detect a completed oscillation; and determine the position of the actuating element based on the detecting of the completed oscillation.

8. A positioning system according to claim 7, wherein the acceleration sensor (7) is arranged on a pole pot of an actuating drive (5) in the form of an electric motor.

9. The positioning system as claimed in claim 7, wherein the positioning system is part of a window lifter installation or sliding roof system.

* * * * *